(12) United States Patent
Blanchard

(10) Patent No.: US 6,692,137 B2
(45) Date of Patent: Feb. 17, 2004

(54) DISPLAY SYSTEM USING A HYBRID BACKLIGHT REFLECTOR

(75) Inventor: Randall D. Blanchard, San Diego, CA (US)

(73) Assignee: L-3 Communications, Phoenix, AZ (US)

( * ) Notice: Subject to any disclaimer, the term of this patent is extended or adjusted under 35 U.S.C. 154(b) by 187 days.

(21) Appl. No.: 09/853,282

(22) Filed: May 11, 2001

(65) Prior Publication Data

US 2002/0167811 A1 Nov. 14, 2002

(51) Int. Cl.$^7$ ................................................ F21V 11/00
(52) U.S. Cl. ...................... 362/241; 362/225; 362/245; 362/330; 362/560; 349/112
(58) Field of Search ................. 362/241–247, 362/561, 560, 224, 225, 330, 217, 235, 31, 26; 349/112, 113

(56) References Cited

U.S. PATENT DOCUMENTS

| | | | |
|---|---|---|---|
| 5,143,433 A | * | 9/1992 | Farrell .......................... 362/29 |
| 5,253,151 A | | 10/1993 | Mepham et al. |
| 5,479,328 A | * | 12/1995 | Lee et al. .................... 362/216 |
| 5,567,042 A | | 10/1996 | Farchmin et al. |
| 5,871,273 A | | 2/1999 | Shaw |
| 6,300,990 B1 | * | 10/2001 | Yamaguchi et al. ......... 349/112 |
| 6,354,709 B1 | * | 3/2002 | Campbell et al. ............. 362/31 |

FOREIGN PATENT DOCUMENTS

JP          01 116528          5/1989

* cited by examiner

Primary Examiner—Sandra O'Shea
Assistant Examiner—John Anthony Ward
(74) Attorney, Agent, or Firm—Fletcher Yoder

(57) ABSTRACT

The present technique relates to a method and apparatus of illuminating a display, which has a display screen, a plurality of lamps and reflector containing both specular and diffuse surfaces. The technique provides a relatively small area specular reflector with a curved surface configured for reflecting a substantial amount of light away from the lamps, into the intermediate areas between the lamps, and toward the display screen. The relatively large remaining area of the reflector provides a diffuse surface to direct some amount of light away from the lamps and toward the display. In addition, this diffuse surface optimizes the performance of light control films integral to the illumination system.

85 Claims, 3 Drawing Sheets

DISPLAY SYSTEM USING A HYBRID BACKLIGHT REFLECTOR

BACKGROUND OF THE INVENTION

1. Field of the Invention

This invention relates generally to display screens and, more particularly, to a method and apparatus for controlling the illumination of a display screen.

2. Description of the Related Art

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Liquid crystal displays, which are commonly known as LCD displays, have been used for a number of years in a wide variety of applications. LCD displays are probably most commonly used for small digital readouts, such as the digital displays found in watches and calculators. The area of such LCD displays is typically no larger than one square inch. As most people who own a watch or calculator having an LCD display are aware, LCD displays must be illuminated for viewing in dim lighting. Accordingly, most devices having relatively small LCD displays include a light source that effectively illuminates the display so that the user of the device can read the display in dimly lit environments.

LCD displays have become increasingly larger in size and, thus, are being used in applications much more complex than providing a simple digital readout. For example, LCD displays are currently a popular choice for desktop computers, portable computers, personal information organizers, point-of-sale (POS) terminals, interactive kiosks, and the like. The area of these relatively large displays is typically greater than five square inches, and these displays may be larger than 100 square inches. These displays are typically illuminated using one or more lamps in an edge lit backlight design.

For edge lit backlights, elongated lamps have been developed in conjunction with diffusion screens. In one typical arrangement, usually used for indoor higher ambient light applications such as factory automation, a first elongated lamp is placed at the top of an LCD display and a second elongated lamp is placed at the bottom of the LCD display. A diffusion screen is placed behind the LCD display between the first and second lamps. This type of diffusion screen is a single sheet of plastic that has reflectors formed in it. These reflectors get progressively larger toward the center of the diffusion screen. To illuminate the LCD display, both lamps are illuminated and the light from each lamp is diffused by the diffusion screen to provide a relatively consistent brightness level over the entire area of the LCD display.

In another typical arrangement, usually used for lower powered devices, a single elongated lamp is placed at the top of an LCD display and a diffusion screen is placed behind the LCD display below the lamp. This type of diffusion screen is also a single sheet of plastic that has reflectors formed in it. However, unlike the previously discussed diffusion screen, these reflectors get progressively larger toward the bottom of the diffusion screen. To illuminate the LCD display, the lamp is illuminated and the light from the lamp is diffused by the diffusion screen to provide a relatively consistent brightness level over the entire area of the LCD display.

For increased brightness, multiple lamps can be used in place of the above single lamps. For displays being used in high ambient light conditions, it is desirable to have a sufficient brightness and uniformity to allow a user to view text and graphics effortlessly. The edge lit backlight typically does not provide an adequate level of image brightness for sunlight readable applications.

To address this problem, a direct backlight using multiple lamps replaces the edge lit backlight. This design can provide over 5 times the display image brightness of an edge lit LCD. These types of displays are not very efficient at transferring light from the bulbs, resulting in a significant loss of light in the transfer from the lamps through the diffusion screen to the LCD display (e.g., a loss of ⅔ of the luminous output from the lamps). For portable and battery powered devices, where battery consumption, size, cost, and efficiency are all important design considerations, this relatively low transfer efficiency is a significant problem.

These types of LCD displays also suffer from various other image quality concerns, such as non-uniformity, glare, reflections, lack of clarity, and a variety of coloration problems such as color separation (e.g., specking artifacts, or rainbow effect that moves with eye movement). Many of these concerns, including brightness and image quality, are more apparent in an outdoor atmosphere (e.g., sunlight, rain, hot and cold temperatures, pollution, etc.), where many LCD displays are now being used.

Accordingly, the present invention may address one or more of the matters set forth above.

SUMMARY OF THE INVENTION

Certain aspects commensurate in scope with the originally claimed invention are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

In accordance with one aspect of the present invention, there is provided a reflector panel adapted for uniformly lighting a display having a plurality of lamps. The reflector panel may include a reflective surface having a plurality of curved sections, the reflective surface being configured to reflect light away from the plurality of lamps and into a plurality of intermediate areas between the plurality of lamps.

In accordance with another aspect of the present invention, there is provided a system for uniformly lighting a display. The system may include a plurality of elongated lamps configured to be disposed behind the display, and a reflector panel configured to be disposed behind the plurality of elongated lamps at a desired offset distance from the display. The reflector panel includes a reflective surface having a plurality of curved sections configured to reflect light substantially around the elongated lamps and into a plurality of intermediate areas between the plurality of elongated lamps. The plurality of curved sections may form a plurality of curved depressions each of which are disposed at least partially behind one of the plurality of elongated lamps.

In accordance with another aspect of the present invention, there is provided a display system. The display system may include a display screen, a diffusion screen disposed behind the display screen, a plurality of elongated lamps disposed behind the diffusion screen and configured to emit light, and a reflector panel disposed behind the plurality of elongated lamps at a desired offset distance from the display screen. The reflector panel includes a reflective surface having a plurality of curved sections configured to reflect light substantially around the elongated lamps and into a plurality of intermediate areas between the plurality of elongated lamps. The plurality of curved sections may form a plurality of curved depressions each of which are disposed at least partially behind one of the plurality of elongated lamps.

In accordance with another aspect of the present invention, there is provided a method of illuminating a display screen. The method may include the act of disposing a reflector panel behind a plurality of elongated lamps positioned adjacent the display screen for illuminating the display screen, wherein the reflector panel has a reflective surface comprising a plurality of elongated curved portions. The plurality of elongated curved portions also may be positioned at a desired position relative to the plurality of elongated lamps such that the reflective surface can reflect light substantially around the elongated lamps and into a plurality of intermediate areas between the plurality of elongated lamps. Moreover, the reflector panel may be positioned at a desired offset distance from the display screen to facilitate substantially uniform illumination of the display screen.

In accordance with another aspect of the present invention, there is provided a method of forming a light reflector assembly for a display. The method may include the acts of forming a reflector panel with a plurality of curved depressions, and forming a reflective surface on the reflector panel for distributing light substantially uniformly toward the display screen. Each of the curved depression are configured to be positioned behind one of the plurality of lamps, which are positioned adjacent a display screen. The reflective surface includes a curved portion disposed in the plurality of curved depressions, providing substantially specular reflection, and an intermediate portion disposed between the plurality of curved depressions, providing substantially diffuse reflection.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
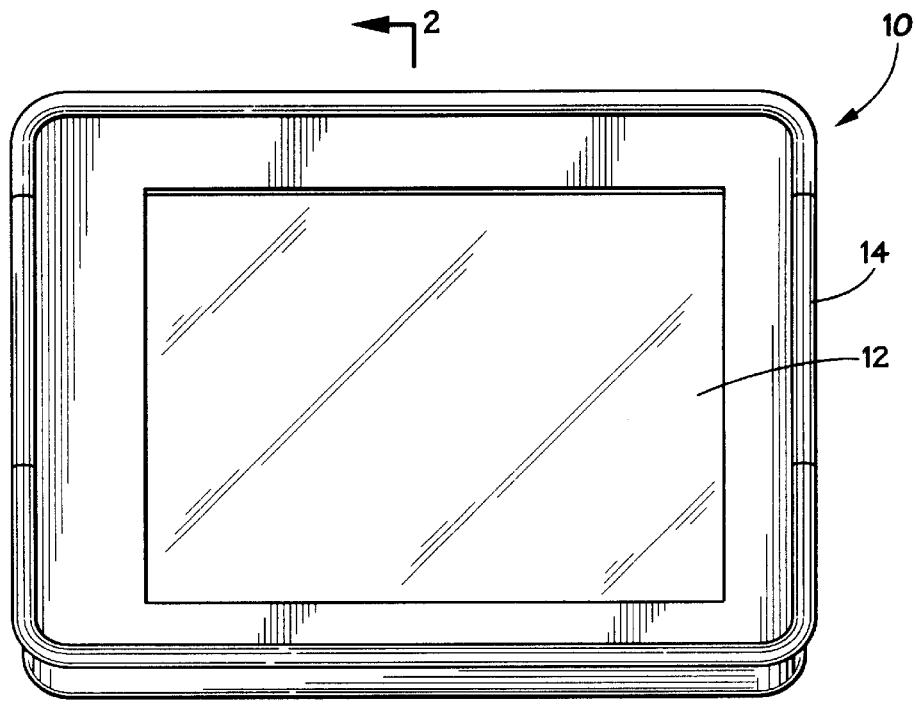
FIG. 1 is a front view of a device having an LCD display.
Figure 2:
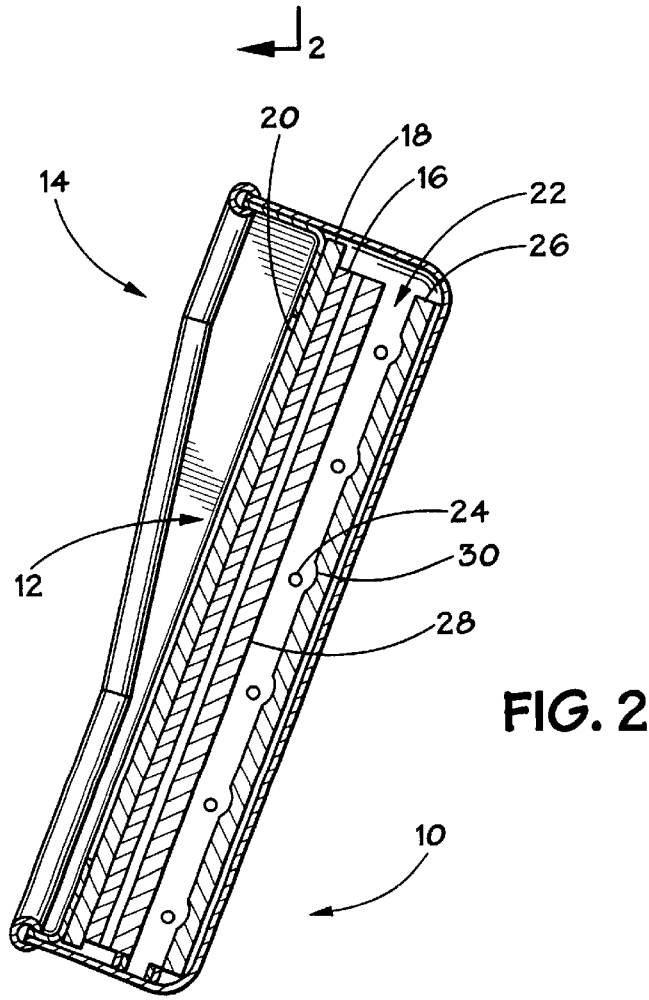
FIG. 2 is a cross-sectional view of the device of FIG. 1 taken along line 2—2 illustrating an exemplary illumination system of the present technique.

Turning now to the drawings, and referring initially to FIGS. 1 and 2, a device having an illuminated LCD display is illustrated and generally designated by a reference numeral 10. The device 10 may be a computer, although a variety of other devices, such as point-of-sale (POS) terminals, information kiosks, and the like, may also benefit from the teachings disclosed herein. The device 10 includes an LCD display 12 housed within a display module 14. The LCD display 12 includes a liquid crystal element 16, which responds to appropriate electrical inputs to display the desired information. Since the manner in which the liquid crystal element 16 operates is well known in the art, details of such operation are not provided in this disclosure.

The front of the liquid crystal element 16 is protected by a window assembly 18, which is normally made of glass or plastic. The window assembly 18 also may include a variety of films, layers and textures to facilitate the desired optical and illumination characteristics of the LCD display 12. The window assembly 18 is mounted within an opening 20 on a front portion of the display module 14 such that users may clearly view the information displayed by the liquid crystal element 16. A specific mounting structure is not illustrated because it should be understood that various mounting arrangements may exist depending on the type of application in which the LCD display 12 is intended to be used. For example, if the display 12 is to be used in a harsh environment, the mounting structure may be shock resistant and include seals to prevent water and dirt from entering the display module 14. The mounting structure may also have a variety of electronic and computer components, such as in a computer system.

A typical liquid crystal element 16 is illuminated for viewing in dim lighting. Accordingly, the present technique provides a back light structure 22 behind the liquid crystal element 16, as illustrated in the various embodiments of FIGS. 3-6. In the exemplary embodiment of FIG. 2, the back light structure 22 comprises one or more light members 24 (e.g., a cylindrical or elongated lamp, or a U-shaped lamp) and a reflector panel 26. The light member 24 provides light in all directions around its longitudinal axis, thereby transmitting light partially toward the liquid crystal element 16 and partially toward the reflector panel 26. Although some light is transmitted laterally, the reflector panel 26 receives light directed away from the liquid crystal element 16, and reflects a substantial portion of the light back toward the liquid crystal panel 16 to increase the illumination and efficiency of the back light structure 22.

In this exemplary embodiment, the back light structure 22 is configured such that a substantial amount of the light provided by the light member 24 is transmitted toward a diffuser panel 28, either directly from the light member 24 or reflected off of the reflector panel 26. The diffuser panel 28 then uniformly distributes the light across its area in order to illuminate the liquid crystal element 16 uniformly.

However, the diffuser panel 28, and other optical panels/layers, may not accept all light rays from the back light structure 22, but rather some of the light rays may be retro-reflected toward the reflector panel 26. According to one aspect of the present technique, the reflector panel 26 reflects these retro-reflected light rays back toward the diffuser panel 28 in a different manner (e.g., a different angle, a different location, etc.) to facilitate distribution, diffusion and transmission of the light rays through the diffuser panel 28 and other optical layers. Accordingly, the reflector panel 26 improves the transfer of light from the light members 24 to the liquid crystal display 16. The reflector panel 26 has a plurality of curved trenches 30 (e.g., U-shaped or cylindrical channels) adjacent the light members 24. The curved trenches 30 are configured to reflect light emitted from the light members 24 at angles directed away from and around the light members 24. Otherwise, the light emitted toward the reflector panel 26 would reflect back into, and be absorbed by, the light members 24. As illustrated, the light members 24 are slightly offset from the curved trenches 30 to ensure that light rays are dispersed away from and around the light members 24. However, a variety of other configurations and geometries may be utilized within the scope of the present technique, as will be further described below. In this manner, the reflector panel 26 creates a more uniformly distributed light source, which is further uniformly distributed by the diffuser panel 28 and optical layers, providing consistent luminosity across the area of the liquid crystal display 16.

Figure 3:
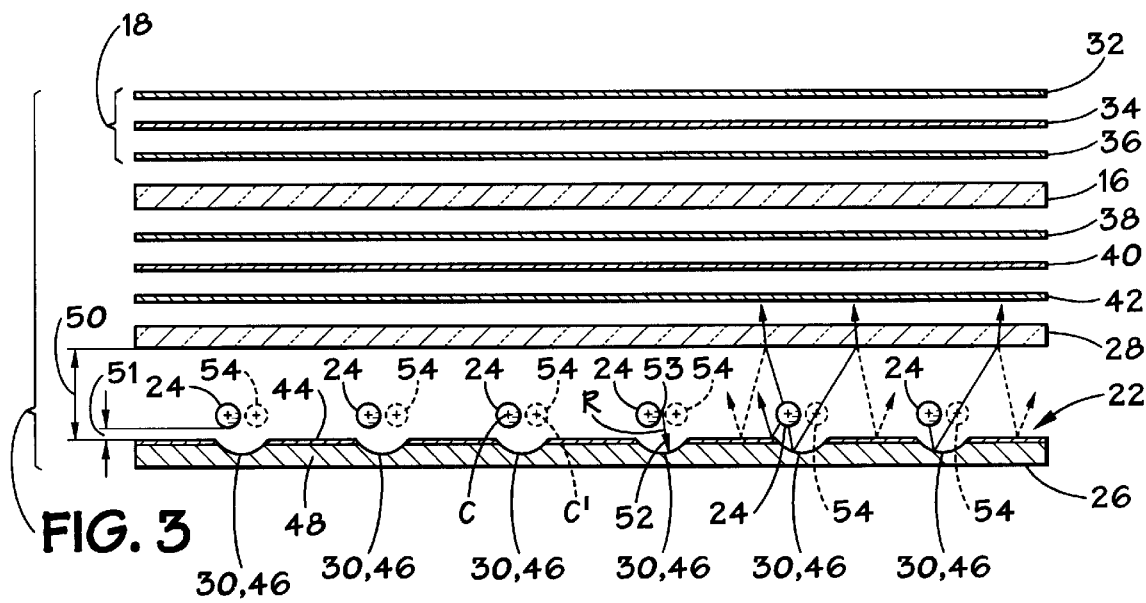
FIG. 3 is a cross-sectional view illustrating a backend portion of an alternate illumination system of the present technique.

FIG. 3 is a cross-sectional view of an alternate embodiment of the LCD display 12 having a plurality of layers/panels to enhance the consistency and luminosity of the display viewable by the user. As illustrated, the LCD display 12 has the window assembly 18, which includes an anti-reflective layer 32, an anti-glare layer 34, and a transparent screen layer 36, disposed adjacent the liquid crystal display 16, brightness enhancement films (BEF) 38, 40 and 42, the diffuser panel 28, and the back light structure 22.

The optical qualities of the LCD display 12 are enhanced by the use of one or more anti-glare and anti-reflective layers 34 and 32, which may be placed over the transparent screen layer 36. The anti-glare layer 34, or matte surface, is provided to reduce the specular (mirror) reflected ambient image. The anti-reflective layer 32, or thin film optical coating, is provided to reduce the total front surface reflection.

The illumination and optical characteristics also may be enhanced by other panels and films disposed about the liquid crystal display 16. For example, brightness enhancement films can be disposed/bonded adjacent the diffuser panel 28. The brightness enhancement films 38, 40 and 42 are provided to enhance the characteristics of the light transmitted from the diffuser panel 28. For example, the brightness enhancement films 38, 40 and 42 may be configured for pre-polarizing light, for bending light vertically, and for bending light horizontally, respectively. In this exemplary embodiment, one or more of the brightness enhancement films 38, 40 and 42 may have microprisms for refracting and reflecting light. Also, one or more of the brightness enhancement films 38, 40 and 42 may be reflective polarizer films or absorptive polarizer films. In the present technique, a reflective polarizer (or pre-polarizer) may be used, as opposed to an absorptive polarizer, to facilitate light transmission through the display. An absorptive polarizer transmits less than half of the light through the display (e.g., 53% absorbed), while a reflective polarizer may advantageously increase brightness of the display (e.g., by 30%).

Accordingly, the brightness enhancement films 38, 40 and 42 enhance scattering and light distribution to procure uniform and brighter illumination of the LCD display 12. Other arrangements, types and numbers of brightness enhancement films can also be applied within the scope of the present technique. Moreover, one or more of the brightness enhancement films can be bonded to the liquid crystal display 16, to the diffuser panel 28, and/or to one another. As noted above, the various display layers may be index matched (i.e., index of refraction) to enhance the efficiency and performance of the LCD display 12.

The surface properties of the reflector panel 26 also may impact the effectiveness of the back light structure 22. In this exemplary embodiment, the reflector panel 26 has reflective surfaces 44 and 46 for scattering and reflecting light from the light members 24 and retro-reflected light from the diffuser panel 28 (and other light films), as illustrated by the solid and dashed arrows, respectively. The reflective surfaces 44, which are disposed on the flat surfaces between the curved trenches 30, may comprise a variety of reflective materials such as a matte reflective vinyl, paint or Teflon coated mesh. For example, the reflective surfaces 44 may comprise a diffuse white or silver material with a high reflectance. Accordingly, light rays striking the reflective surfaces 44 diffusely reflect toward the display layers (e.g., the diffusion panel 28, BEFs, etc.). The reflective surfaces 46, which are disposed in the curved trenches 30, also may comprise a variety of materials to facilitate a high reflectance. For example, the reflective surfaces 46, or mirror surfaces, may comprise a plastic (e.g., Mylar) silver coated film. In the present technique, the reflective surfaces 44 and 46 advantageously have a reflectance of over 85 or 90%, and may have a reflectance of over 95%. For example, the reflective surfaces 44 may embody a diffuse flat white sheet having a 98% reflectance, while the reflective surface 46 may embody a specular (mirror) film having a 95% reflectance. The reflector panel 26 can be manufactured from a variety of substrates (e.g., a substrate 48), such as an aluminum block, a moldable plastic, or other materials suitable for the particular device.

The back light structure 22 is offset from the diffuser panel 28 at an offset distance 50 (e.g., ½ to 1 inch), which may significantly impact the overall lighting performance of the LCD display 12. As the offset distance 50 increases, the diffuser panel 28 works more efficiently at transferring and uniformly distributing light rays. The geometry and positioning of the light members 24 relative to the curved trenches 30 also impacts the performance of the back light structure 22. As illustrated in FIG. 3, the light members 24 are offset from the curved trenches 30 at a light offset distance 51, which may vary according to the dimensions of the light members 24 and the curved trenches 30. For example, the curved trenches 30 may range from 1 to 2 times the diameter of the light members 24, or even greater, depending on the geometry of the curved trenches 30 and light members 24. Also, the light offset distance may be measured from either the center or edges of the curved trenches 24 to either the center or edge of the light members 24. The curved trenches 30 also have a curve radius 52 (R), which may be measured from an edge 53 of the respective light members 24 aligned with a centerline extending through the light members 24. Accordingly, the light offset distance 51, the curve radius 52, and the size and spacing of the light members 24 can be modified and correlated to facilitate the desired reflection and distribution of light from the light members 24.

At an appropriate light offset distance 51, curve radius 52 and with an appropriate geometry of the curved trenches 30, the light emitted from the light members 24 reflects off of the reflective surfaces 46 (i.e., the curved trenches 30) and around the light members 24 to create virtual light members 54 (i.e., the appearance of a second light source) opposite from the light members 24 relative to the curved trenches 30. As illustrated, the light rays being emitted normally from the light members 24 (e.g., as if originating from a center C of the light members 24) are reflected off of the reflective surfaces 46 and are transmitted through a center C' of the virtual light members 54. In this manner, the light rays passing through the center C' are transmitted toward the diffuser panel 28 as if originating from another actual light member disposed adjacent the light members 24 and centered at C'.

The width of the curved trenches 30 may vary, but the present technique advantageously provides sufficiently wide curved trenches 30 to avoid light reflection back into the light members 24 (i.e., overlap between the light members 24 and the virtual light members 54). By reflecting light around the light members 24 (i.e., avoiding absorption into the light members 24) and creating the virtual light members 54, the back light structure 22 effectively increases the amount of light transmitted to the liquid crystal display 16. Moreover, the increased illumination efficiency allows a back light configuration using relatively fewer lights, which in turn, further lowers the light loss/absorption back into the light members 24 (i.e., fewer lights results in less area to absorb light). The desired number light members 24 may vary according to various factors, such as the desired illumination intensity and uniformity, light output from an individual light member 24, cost, power consumption, and dimensions of the light members 24 and the reflector panel 26 (e.g., areas measured from the top view in FIG. 4).

As illustrated by the solid arrows in FIG. 3, the light rays emitted by the light members 24 travel toward the diffuser panel 28 either directly from the light members 24 or reflected off of the reflector panel 26. Upon reaching the diffuser panel 28, the light rays travel through the diffuser panel 28 at an angle of refraction corresponding to the material and surface properties of the diffuser panel and toward the liquid crystal display 16. However, the majority of the light rays (i.e., retro-reflected light rays), as indicated by the dashed arrows, reflect off the diffuser panel 28 (and other display layers) and backwardly to the back light structure 22. The reflective surfaces 44 and 46 of the reflector panel 26 then reflect these retro-reflected light rays toward the diffuser panel 28 (and subsequent display layers) at a different angle, polarization, and location. Accordingly, the reflective surfaces facilitate the distribution and transfer of light rays toward the diffuser panel 28, and subsequent display layers, to facilitate substantially uniform illumination of the display. Moreover, the reflective surfaces 44 may have diffusive characteristics (e.g., a diffuse white surface) to scatter the light rays and to cause further distribution and depolarization of the light.

Figure 4:
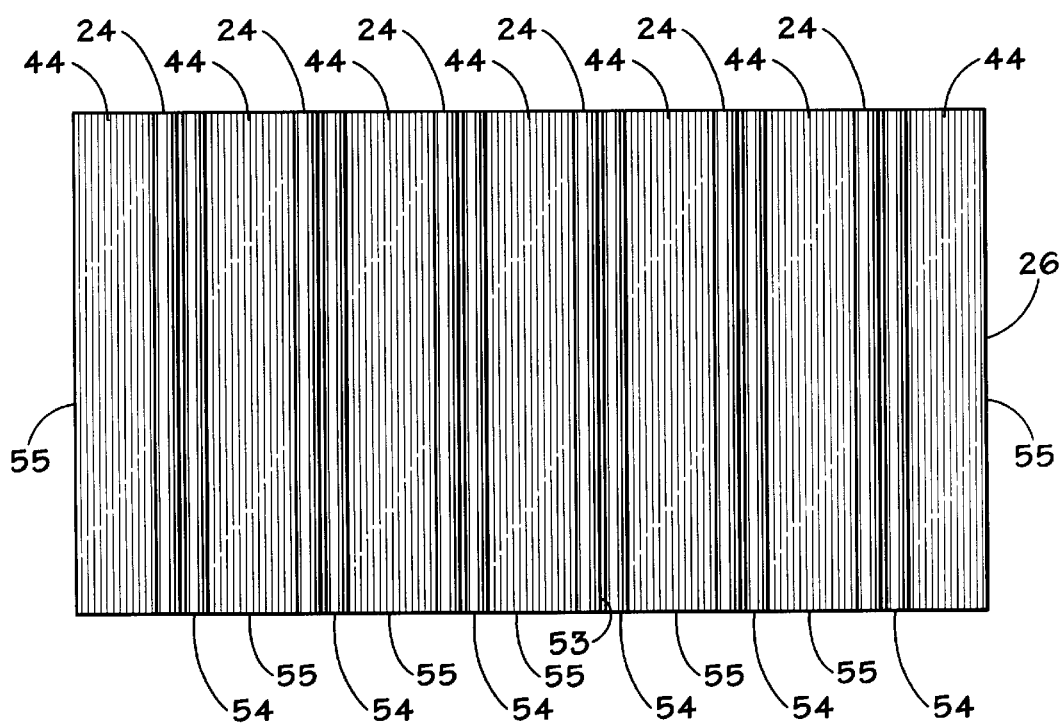
FIG. 4 is a top view of the illumination system of FIG. 3, illustrating the illuminated areas from light members and virtual light members.

FIG. 4 is a top view of the back light structure 22, illustrating the light members 24, the virtual light members 54, and adjacent dark areas 55 between the light members 24 and virtual light members 54. Absent the reflector panel 26, the adjacent dark areas 55 would comprise the unlit areas between the light members 24. As illustrated, the curved trenches 30 advantageously reflect light to an unlit area adjacent the light members 24 to partially light the adjacent dark areas 55 (i.e., forming the virtual light members 54). The increased illumination provided by the virtual light members 54 allows a simpler arrangement of the light members (i.e., fewer light members 24), which in turn increases the unlit gaps (i.e., no light source) between the light members 24. Accordingly, the reflective surfaces 44 are provided to light the adjacent dark areas 55 between each pair of the light members 24 and the virtual light members 54 (i.e., directly above the reflective surfaces 44). The reflective surfaces 44 advantageously reflect light originating from the light members 24 and from light reflected back from the display (e.g., from the brightness enhancement films 38, 40 and 42). As discussed above, the reflective surfaces 44 may comprise a diffuse white surface to reflect and distribute light rays toward the display. Thus, the reflective surfaces 44 and 46 substantially light the adjacent dark areas 55 between the light members 24.

The virtual light members 54 partially light the adjacent dark areas 55 via the reflective surfaces 46, while the reflective surfaces 44 substantially light the remaining portion. As discussed above, the geometry of the curved trenches 30 and the light members 24 significantly controls the effective uniformity of light directed toward the liquid crystal display 16. For example, the curved trenches 30 and the light members 24 may be configured to reflect the virtual light members 54 further away from the light members 24 to provide a more uniform spacing between the light members 24 and the virtual light members 54. Accordingly, the uniform spacing may substantially improve the uniformity and intensity of the light transmitted to the display screen. As illustrated in FIG. 4, the light members 24 and the virtual light members 54 essentially create a single rectangular light source of twice the width of the light member 24. Although the present technique may be configured to distribute light at the back light structure 22 more uniformly, this configuration reflects the virtual light members 54 adjacent the light members 24. Accordingly, this configuration greatly benefits from the diffuser panel 28 and the brightness enhancement films 38, 40 and 42, as discussed above. In any configuration of the curved trenches 30, the reflective surfaces 44 also greatly improve the distribution and uniformity of light directed toward the display screen.

The present technique also enhances light utilization (i.e., efficiency) by providing the reflective surfaces 44 and 46, which capture and reflect a substantial amount of light back toward the display screen. As discussed above, some light may retro-reflect off the diffuser panel 28 or the brightness enhancement films 38, 40 and 42. The reflective surfaces 44 (e.g., a diffuse white surface) effectively redirect this light back toward the liquid crystal display 16 for another attempt at passing through the diffuser panel 28 and BEFs 38, 40 and 42. The reflective surfaces 44 also scatter the light, such that the light is more uniformly distributed at the back light structure 22. Moreover, the present technique decreases the amount of retro-reflected light absorbed by the light members 24, because the present technique allows a lower number of light members 24 to be utilized to produce an equal amount of light.

As will be appreciated, the exemplary techniques illustrated herein describe various methods of forming a light reflector assembly and methods of illuminating a display (e.g., LCD display 12). As discussed above, the reflector panel 26 can be formed from a variety of materials to provide reflective surfaces 44 and 46, the latter being disposed in the curved trenches 30 for positioning behind the light members 24. The reflector panel 26 also may be formed with other curved surfaces and configurations, such as the embodiments illustrated below in FIGS. 5 and 6. To illuminate the display, the present technique may involve the act of disposing the reflector panel 26 behind the light members 24 (e.g., a plurality of elongated lamps) to illuminate the display screen. The methods also may include the act of positioning the curved trenches 30 (e.g., a plurality of elongated curved portions, or concave depressions) at a desired position relative to the light members 24 such that the reflective surfaces 46 of the curved trenches 30 can reflect light substantially around the light members 24 and into the plurality of intermediate areas between the light members 24 (e.g., the adjacent dark areas 55). For example, the curved trenches 30 may be partially disposed behind the light members 24, as illustrated in FIG. 3, or may be entirely disposed behind one or more of the curved trenches, such as in the embodiments illustrated in FIGS. 5–7. Depending on the configuration and geometry, the light members 24 reflect light to an unlit area adjacent the light members 24 (i.e., to produce virtual light members 54) to facilitate substantially uniform illumination of the display.

Figure 5:
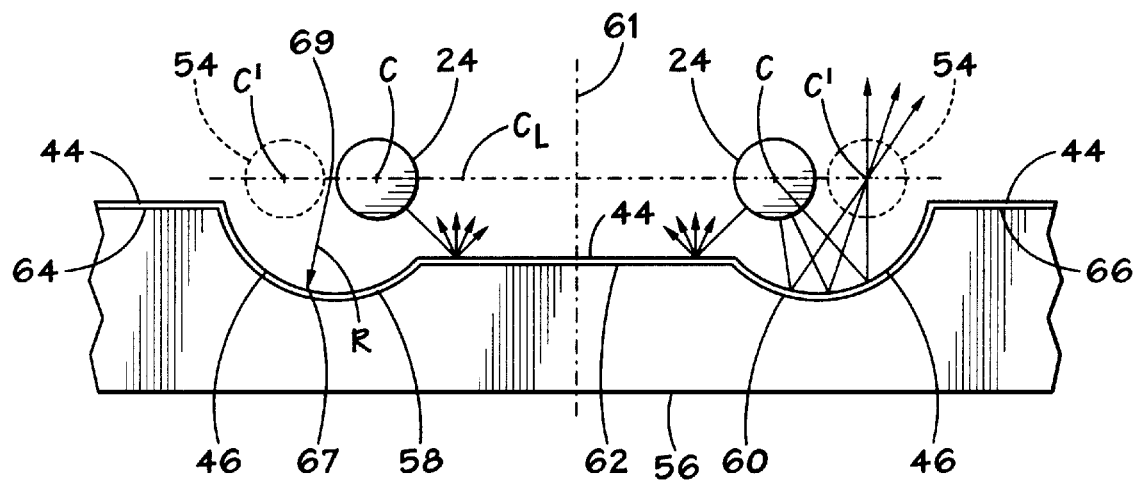
FIGS. 5 and 6 are partial cross-sectional views illustrating alternate backend portions of illumination systems of the present technique.
Figure 6:
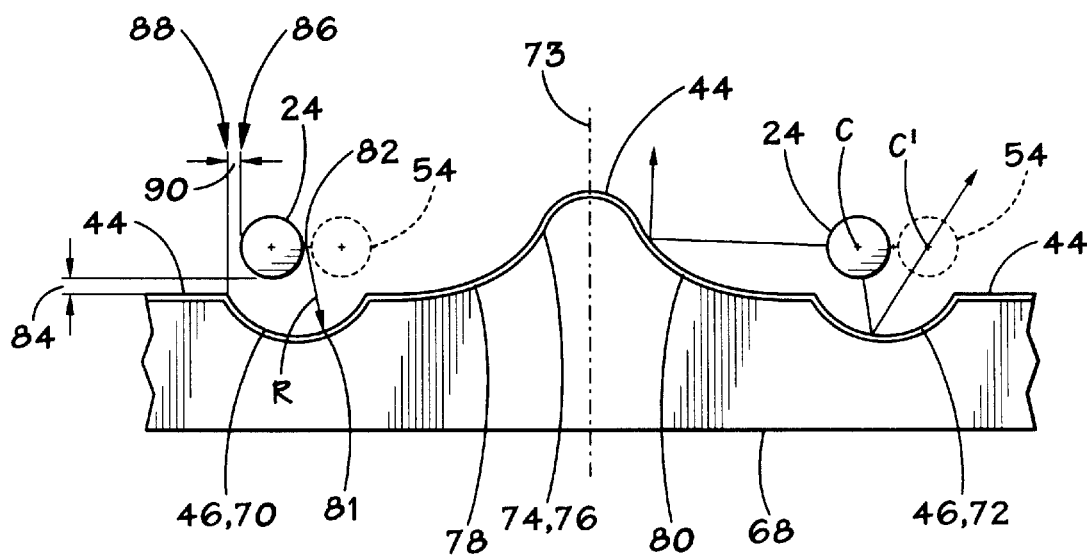

As illustrated in FIGS. 5 and 6, the present technique may be employed using a variety of back light structures 22. FIG. 5 is a partial side view of a first alternate embodiment of the back light structure 22 having light members 24 and a reflector panel 56. The reflector panel 56 has a symmetrically opposite pair of curved channels 58 and 60 disposed about a centerplane 61 through a surface 62 and between surfaces 64 and 66, respectively. In this embodiment, the surface 62 is relatively lower than the surfaces 64 and 66, and the light members 24 are disposed at symmetrically opposite locations relative to the centerplane 61. Alternatively, the present technique may utilize an elongated-U-shaped light member instead of the pair of light members 24. The light members 24 are offset from the curved channels 58 and 60 toward the surface 62, and are disposed relatively lower than the surfaces 64 and 66. The reflector panel 56 also has the reflective surfaces 44 (e.g., diffuse white films) disposed on the surfaces 62, 64 and 66, and has the reflective surfaces 46 (e.g., mirror surfaces) disposed on the curved channels 58 and 60. Accordingly, although the particular dimensions may vary by application, the embodiment of FIG. 5 allows light rays to reflect around the light members 24, to create virtual light sources adjacent the light members 24, and to transmit light toward the liquid crystal display 16 to provide a substantially uniform and bright viewable area.

Accordingly, as discussed above with reference to FIG. 3, the curved channels 58 and 60 illustrated in FIG. 5 have a curve radius 67 (R), which may be measured from an edge 69 of the respective light members 24 aligned with a centerline (CL) extending through the light members 24 and the virtual light members 54. Accordingly, the curve radius 67 and the size, spacing and orientation of the light members 24 relative to the curved channels 58 and 60 and the reflective surfaces 44 and 46 can be modified and correlated to facilitate the desired reflection and distribution of light from the light members 24. As illustrated, the light rays being emitted normally from the light members 24 (e.g., as if originating from a center C of the light members 24) are reflected off of the reflective surfaces 46 and are transmitted through a center C' of the virtual light members 54. In this manner, the light rays passing through the center C' are transmitted toward the diffuser panel 28 as if originating from another actual light member disposed adjacent the light members 24 and centered at C'.

In contrast to the embodiment illustrated in FIG. 3, the embodiment illustrated in FIG. 5 is configured such that the light members 24 can be positioned partially below the surfaces 64 and 66. Accordingly, lateral light rays emitted from the light members 24 are partially saved by reflective surfaces 46 and are reflected toward the display, as illustrated by the solid arrows. The reflective surfaces 44 diffusely reflect light rays, which originate either directly from the light members 24 or retro-reflected off the display layers (e.g., the diffusion panel 28), toward the display layers to facilitate uniform illumination of the display. The embodiment of FIG. 5 also facilitates the use of elongated-u-shaped lamps for the light members 24. The mirror symmetry and positioning of the light members 24 is also adapted for minimizing the radius of the U-shaped portion of the elongated-u-shaped lamps. Accordingly, the configuration of FIG. 5 may substantially reduce the space requirements for the back light structure 22.

FIG. 6 is a partial side view of second alternate embodiment of the back light structure 22 having light members 24 and a reflector panel 68. In contrast to the embodiments illustrated in FIGS. 2–5, the reflector panel 68 has a curved ridge 74 rather than a flat surface disposed between the light members 24. The curved ridge 74 may have a variety of curved geometries (e.g., a gentle curve, a sharp curve, a sharp point, etc.) configured for capturing and reflecting lateral light rays toward the display, thereby improving the efficiency of the back light structure 22. The curved ridge 74 also facilitates distribution of retro-reflected light to illuminate the display in a substantially uniform manner. A pair of curved channels 70 and 72 (i.e., concave channels or depressions) are disposed adjacent, and on opposite sides of, the curved ridge 74 (i.e., a convex ridge) for reflecting backwardly directed light rays around the light members 24.

As illustrated, the curved channels 70 and 72 are essentially cylindrical in shape, while the curved ridge 74 has a convex portion 76 between concave portions 78 and 80. The light members 24 are disposed adjacent, and offset from, the curved channels 70 and 72, such that the light members 24 are equally spaced over the reflector panel 68. The reflector panel 68 also has the reflective surfaces 44 (e.g., diffuse white films) disposed on the curved ridge 74, and has the reflective surfaces 46 (e.g., mirror surfaces) disposed on the curved channels 70 and 72. Accordingly, although the particular dimensions may vary by application, the embodiment of FIG. 6 advantageously positions the curved channels 70 and 72 behind the light members 24 to reflect backwardly directed light rays around the light members 24 and toward the display.

As illustrated above in FIGS. 3 and 5, the curved channels 70 and 72 illustrated in FIG. 6 have a curve radius 81 (R), which may be measured from an edge 82 of the respective light members 24 aligned with a centerline extending through the light members 24. The light members 24 are also offset from the reflective surfaces 44 by a light offset distance 84, which may be varied to enhance the reflective properties (e.g., focus) of the reflective surfaces 46. Depending on the size of the light members 24 and the radius 81 of the curved channels 70 and 72, an edge 86 of the light members 24 may be offset from an edge 88 of the curved channels 70 and 72 by an offset distance 90. The offset distance 90 may extend inside the width of the curved channels 70 and 72, as illustrated, or partially outside the width of the curved channels 70 and 72. The offset distance 90 also may be zero or virtually zero, placing the edge 86 of the light members 24 at the edge 88 of the curved channels 70 and 72. Accordingly, the curve radius 81, the offset distances 84 and 90 and the overall geometry and orientation of the light members 24 relative to the curved channels 70 and 72 and the reflective surfaces 44 and 46 can be modified and correlated to facilitate the desired reflection and distribution of light from the light members 24. As illustrated, the light rays being emitted normally from the light members 24

(e.g., as if originating from a center C of the light members 24) are reflected off of the reflective surfaces 46 and are transmitted through a center C' of the virtual light members 54. In this manner, the light rays passing through the center C' are transmitted toward the diffuser panel 28 as if originating from another actual light member disposed adjacent the light members 24 and centered at C'.

The curved ridges 74 also enhance light scattering and distribution by reflecting lateral light rays toward the display. The lateral light rays are either emitted directly from the light members 24 or they are retro-reflected from the diffuser panel 28, brightness enhancement films 38, 40 and 42, and the liquid crystal display 16. Accordingly, the curved ridge 74 captures and redirects light rays that otherwise may be lost, and thereby improves the illumination performance of the backlight structure 22. For example, the reflector panel 68 may provide sufficiently uniform light to permit removal of one or more of the diffuser panel 28 and the brightness enhancement films 38, 40 and 42. Altogether, the geometry of the light members 24, curved channels 70 and 72, and ridges 74 are tailored to procure scattering, distribution and uniformity of light waves for the liquid crystal display 16.

Accordingly, the present technique provides a substantially uniform brightness for a display and, also, may provide a substantially greater brightness for the display. For example, the present technique may provide over 600 foot-Lamberts of display brightness for a 12.1 inch liquid crystal display with a power of 35 watts.

As will be appreciated, the exemplary techniques illustrated above describe various methods of illuminating a display, utilizing reflective surfaces to direct light rays toward the display. Accordingly, the methods may include the act of positioning one of a plurality of intermediate ridges (e.g., curved ridge 74) between each of the light members 24. Moreover, the method may include the act of positioning the reflector panel 26 at a desired offset distance from the display screen (e.g., offset distance 50 relative to the diffuser panel 28) to allow light to disperse and to facilitate substantially uniform illumination. Various other panels and films also may be disposed within the display, as described above. If the display is an existing display, then the method may include retrofitting the reflector panel 26 into the display.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A reflector panel adapted for uniformly lighting a display having a plurality of lights, the reflector panel comprising:
a reflective surface having a plurality of curved sections, the reflective surface being configured to reflect light away from the plurality of lights and into a plurality of intermediate areas between the plurality of lights, wherein the plurality of curved sections comprise a convex ridge configured to be disposed between a pair of the plurality of lights.

2. The reflector panel of claim 1, comprising a display screen positioned in front of the plurality of lights, wherein the reflective surface is positioned behind the plurality of lights.

3. The reflector panel of claim 2, wherein the display screen comprises a liquid crystal screen.

4. The reflector panel of claim 1, wherein the curved sections are uniformly spaced.

5. The reflector panel of claim 1, comprising a plurality of brightness enhancement films positioned in front of the plurality of lights, wherein the reflective surface is positioned behind the plurality of lights.

6. The reflector panel of claim 1, wherein the reflective surface comprises plastic.

7. The reflector panel of claim 1, wherein the reflective surface comprises silicone.

8. The reflector panel of claim 1, wherein the reflective surface comprises vinyl.

9. The reflector panel of claim 1, wherein the reflective surface comprises paint.

10. The reflector panel of claim 1, wherein the reflective surface comprises a white material.

11. The reflector panel of claim 1, wherein the reflective surface comprises a silver material.

12. The reflector panel of claim 1, wherein the reflective surface comprises a light diffusive surface.

13. The reflector panel of claim 1, wherein the reflective surface comprises a surface having a reflectance of greater than 90 percent.

14. The reflector panel of claim 1, wherein the plurality of curved sections comprise a plurality of concave depressions, each one of the concave depressions being configured to be at least partially positioned behind one of the plurality of lights.

15. The reflector panel of claim 14, wherein the reflective surface comprises a diffusive surface disposed between the plurality of concave depressions.

16. The reflector panel of claim 14, wherein the reflective surface comprises a mirror surface disposed in the plurality of concave depressions.

17. The reflector panel of claim 14, wherein each of the plurality of concave depressions is disposed behind one of the plurality of lights, each concave depression having a first side being positioned adjacent an edge of the light to reflect light rays around the light to an opposite side of the concave depression to produce a virtual light source adjacent to the light.

18. The reflector panel of claim 17, wherein each one of the virtual light sources comprises a reflected image of one of the plurality of lights.

19. The reflector panel of claim 17, wherein the plurality of concave depressions comprises a plurality of cylindrical channels, and the plurality of lights comprises a plurality of elongated lights.

20. The reflector panel of claim 1, wherein the reflector panel is configured to reflect and disperse light substantially uniformly toward the display to facilitate consistent illumination over a viewable area of the display.

21. A reflector panel adapted for uniformly lighting a display having a plurality of elongated lights, the reflector panel comprising:
a reflective surface having a plurality of cylindrical channels, the reflective surface being configured to reflect light away from the plurality of elongated lights and into a plurality of intermediate areas as virtual light sources between the plurality of elongated lights, wherein the plurality of cylindrical channels and the plurality of elongated lights are arranged in pairs, each pair of cylindrical channels and elongated lights being symmetrically arranged relative to a centerline for the pair.

22. The reflector panel of claim 21, comprising a plurality of intermediate ridges configured to be positioned between the plurality of cylindrical channels and between the plurality of elongated lights.

23. The reflector panel of claim 22, wherein the plurality of intermediate ridges comprises a convex ridge configured to be positioned between each pair of the plurality of elongated lights.

24. The reflector panel of claim 22, wherein the plurality of cylindrical channels form the plurality of intermediate ridges, and the plurality of intermediate ridges comprise a sharp ridge.

25. The reflector panel of claim 1, wherein each of the plurality of curved sections has a radius measured from an edge point of an adjacent one of the plurality of lights, the edge point being aligned with a centerline passing through the plurality of lights.

26. The reflector panel of claim 25, wherein the curved sections have a geometry configured to reflect light rays being emitted normally from the plurality of lights through a point disposed adjacent the plurality of lights.

27. The reflector panel of claim 26, wherein the point is a center of a virtual light source created by light rays emitted from the plurality of lights and reflected off of the plurality of curved sections.

28. A system for uniformly lighting a display, comprising
a plurality of elongated lamps configured to be disposed behind the display; and
a reflector panel configured to be disposed behind the plurality of elongated lamps at a desired offset distance from the display, wherein the reflector panel has a reflective surface comprising a plurality of curved sections configured to reflect light substantially around the elongated lamps and into a plurality of intermediate areas between the plurality of elongated lamps, the plurality of curved sections comprising a plurality of curved depressions and a plurality of intermediate convex ridges, wherein each of the plurality of curved depressions is disposed at least partially behind one of the plurality of elongated lamps and each of the plurality of intermediate convex ridges is disposed between the plurality of elongated lamps.

29. The system of claim 28, wherein the display comprises a liquid crystal screen.

30. The system of claim 28, wherein the plurality of elongated lamps and the reflector panel are jointly configured to distribute light away from the plurality of elongated lamps and toward the display to illuminate the display in a substantially uniform manner.

31. The system of claim 30, wherein the display comprises a light diffusion screen adjacent the plurality of elongated lamps.

32. The system of claim 28, wherein the reflective surface comprises plastic.

33. The system of claim 28, wherein the reflective surface comprises a matte surface disposed between the plurality of elongated lamps.

34. The system of claim 28, wherein the reflective surface comprises a surface having a reflectance greater than 90 percent.

35. The system of claim 28, wherein the reflective surface comprises a surface having a reflectance greater than 95 percent.

36. The system of claim 28, wherein the reflective surface comprises a light diffusive surface disposed between the plurality of elongated lamps.

37. The system of claim 36, wherein the light diffusive surface is configured to disperse light substantially uniformly toward the display.

38. The system of claim 28, wherein each one of the plurality of elongated lamps is disposed toward a side of one of the plurality of curved depressions, and each curved depression is configured to reflect light from the elongated lamp to an opposite side of the curved depression.

39. The system of claim 28, wherein the plurality of intermediate convex ridges are configured to reflect lateral light rays toward the display.

40. The system of claim 28, wherein each one of the plurality of curved sections has a radius measured from an edge of an adjacent one of the plurality of elongated lamps, the edge being aligned with a line passing through a center of the respective one of the plurality of elongated lamps and being parallel with at least a portion of the reflective surface.

41. The system of claim 40, wherein the curved sections have a geometry configured to reflect light rays being emitted normally from the plurality of elongated lamps through a point disposed adjacent the plurality of elongated lamps.

42. The system of claim 28, wherein the plurality of curved depressions comprises a plurality of elongated concave channels.

43. A display system comprising:
a display screen;
a diffusion screen disposed behind the display screen;
a plurality of elongated lamps disposed behind the diffusion screen and configured to emit light; and
a reflector panel disposed behind the plurality of elongated lamps at a desired offset distance from the display screen, the reflector panel having a reflective surface comprising a plurality of curved sections configured to reflect light substantially around the elongated lamps and into a plurality of intermediate areas as virtual light sources between the plurality of elongated lamps, the plurality of curved sections comprising a plurality of curved depressions each of which are disposed at least partially behind one of the plurality of elongated lamps, wherein the plurality of curved depressions and the plurality of elongated lamps are arranged in pairs, each pair of curved depressions and elongated lamps being symmetrically arranged relative to a centerline for the pair.

44. The system of claim 43, wherein the display screen comprises a liquid crystal screen.

45. The system of claim 43, wherein the diffusion screen is configured to facilitate a relatively uniform brightness level over its entire surface.

46. The system of claim 43, wherein the plurality of elongated lamps and the reflector panel are jointly configured to distribute light away from the plurality of elongated lamps and toward the display screen in a substantially uniform manner to facilitate consistent illumination over a viewable area of the display screen.

47. The system of claim 43, wherein the reflective surface comprises a white matte surface disposed between the plurality of elongated lamps.

48. The system of claim 43, wherein the reflective surface comprises a surface having a reflectance greater than 90 percent.

49. The system of claim 43, wherein the reflective surface comprises a light diffusive surface disposed between the plurality of elongated lamps.

50. The system of claim 43, wherein each one of the plurality of elongated lamps is disposed toward a side of one of the plurality of curved depressions, and each curved depression is configured to reflect light from the elongated lamp to an opposite side of the curved depression.

51. The system of claim 43, wherein the plurality of curved sections comprise a plurality of intermediate ridges extending between the plurality of elongated lamps.

52. The system of claim 51, wherein the plurality of intermediate ridges comprise a convex ridge.

53. The system of claim 43, wherein each one of the plurality of curved sections has a radius measured from an edge of an adjacent one of the plurality of elongated lamps, the edge being aligned with a line passing through a center of the respective one of the plurality of elongated lamps and being substantially parallel with the reflector panel.

54. The system of claim 43, wherein the curved sections have a geometry configured to reflect light rays being emitted normally from the plurality of elongated lamps through a common point disposed adjacent the plurality of elongated lamps.

55. The system of claim 43, comprising a plurality of brightness enhancement films positioned between the display screen and the diffusion screen.

56. The system of claim 43, comprising an anti-glare layer disposed in front of the display screen.

57. The system of claim 43, comprising an anti-reflection layer in front of the display screen.

58. A method of illuminating a display screen, the method comprising the acts of:
    disposing a reflector panel behind a plurality of elongated lamps positioned adjacent the display screen for illuminating the display screen, wherein the reflector panel has a reflective surface comprising a plurality of elongated curved portions;
    arranging the plurality of elongated curved portions and the plurality of elongated lamps in pairs symmetrically disposed about an intermediate centerline;
    offsetting the plurality of elongated curved portions at a desired position relative to the plurality of elongated lamps such that the reflective surface can reflect light substantially around the elongated lamps and into a plurality of intermediate areas as virtual light sources between the plurality of elongated lamps; and
    positioning the reflector panel at a desired offset distance from the display screen to facilitate substantially uniform illumination of the display screen.

59. The method of claim 58, comprising the acts of:
    positioning the reflector panel behind a liquid crystal display screen; and
    positioning the plurality of elongated lamps between the reflector panel and the liquid crystal display screen.

60. The method of claim 58, comprising the acts of:
    positioning a diffusion screen behind the display screen; and
    positioning the plurality of elongated lamps between the diffusion screen and the reflector panel, wherein the diffusion screen provides a relatively uniform brightness level over its entire surface.

61. The method of claim 60, comprising the act of:
    disposing a plurality of light control films between the display screen and the diffusion screen.

62. The method of claim 60, comprising the act of:
    disposing a reflective polarizer layer behind the display screen.

63. The method of claim 58, wherein the act of offsetting the plurality of elongated curved portions comprises the act of:
    positioning a plurality of elongated concave depressions such that each of the elongated concave depressions is at least partially disposed behind one of the plurality of elongated lamps.

64. The method of claim 63, wherein the act of positioning the plurality of elongated concave depressions comprises the act of:
    positioning a first side of each elongated concave depression adjacent an edge of each elongated lamp such that light rays emitted from each elongated lamp reflect around the elongated lamp to a common point at an opposite side of the elongated concave depression.

65. The method of claim 58, wherein the act of offsetting the plurality of elongated curved portions comprises the act of:
    positioning one of a plurality of intermediate ridges between each of the plurality of elongated light bulbs.

66. The method of claim 58, wherein the act of offsetting the plurality of elongated curved portions at the desired position comprises the act of:
    positioning each one of the plurality of elongated curved portions such that a center of a curve radius for the respective one of the plurality of elongated curved portions is oriented at an edge of an adjacent one of the plurality of elongated lamps.

67. The method of claim 58, comprising the act of:
    retrofitting the reflector panel into the display.

68. The method of claim 67, comprising the act of:
    retrofitting the plurality of elongated lamps into the display between the display screen and the reflector panel.

69. A method of forming a light reflector assembly for a display, the method comprising the acts of:
    forming a reflector panel with a plurality of curved depressions and intermediate convex ridges, wherein each curved depression is configured to be positioned behind one of a plurality of lamps and each intermediate convex ridge is configured to be positioned between a pair of the plurality of lamps, which are adapted to be positioned adjacent a display screen; and
    forming a reflective surface on the reflector panel for distributing light substantially uniformly toward the display screen, wherein the reflective surface comprises a curved portion disposed in the plurality of curved depressions and an intermediate portion disposed on the intermediate convex ridges.

70. The method of claim 69, wherein the plurality of curved depressions comprises a plurality of elongated depressions and the plurality of lamps comprises a plurality of elongated lamps.

71. The method of claim 69, wherein the act of forming a reflector panel with a plurality of curved depressions comprises the act of:
    forming a curve radius for each one of the plurality of curved depressions measured from an edge of an adjacent one of the plurality of lamps, the edge being aligned with a centerline extending through centerpoints for the plurality of lamps.

72. The method of claim 69, comprising the act of:
    integrating the plurality of lamps and the reflector panel to distribute light away from the plurality of lamps and toward the display screen to facilitate relatively uniform illumination of a viewable area of the display screen.

73. The method of claim 72, comprising the act of:
    positioning a diffusion screen between the display screen and the plurality of lamps.

74. The method of claim 73, wherein the display screen comprises a liquid crystal display.

75. The method of claim 73, comprising the act of:

positioning a plurality of light control layers between the diffusion screen and a viewable area of the display screen.

76. The method of claim 75, comprising the act of:

positioning a reflective polarizer display screen and the diffusion screen.

77. The method of claim 69, wherein the reflective surface comprises a plastic.

78. The method of claim 69, wherein the reflective surface has a reflectance of greater than 90 percent.

79. The method of claim 69, wherein the intermediate portion of the reflective surface comprises a light diffusive surface.

80. The method of claim 69, comprising the act of:

reflecting light substantially around the lamps and into intermediate areas between the plurality of lamps.

81. A lighting system, comprising:

a backlight reflector comprising a plurality of concave reflective surfaces; and a plurality of elongated lamps disposed at a vertical offset from the backlight reflector, wherein each lamp of the plurality of elongated lamps is disposed in front of one surface of the plurality of concave reflective surfaces at a horizontally off-center point relative to the one surface.

82. The light system of claim 81, wherein plurality of concave reflective surfaces each comprise a cylindrical channel.

83. The light system of claim 81, wherein the backlight reflector comprises a reflective convex surface disposed between adjacent pairs of the plurality of concave reflective surfaces.

84. The light system of claim 81, wherein the plurality of concave reflective surfaces and the plurality of elongated lamps are arranged in pairs, each pair of concave reflective surfaces and each pair of elongated lamps being symmetrically arranged relative to a common centerline for the pairs.

85. The light system of claim 81, wherein each of the plurality of concave reflective surfaces has a focal point horizontally offset from the horizontally off-center point of each lamp, such that a virtual light source emanates from the focal point during operation of each lamp.

* * * * *